United States Patent
Tajima

[15] 3,665,186
[45] *May 23, 1972

[54] HALF TONE RADIOGRAPHY METHOD AND APPARATUS

[72] Inventor: Mataichi Tajima, Kanagawa, Japan

[73] Assignee: Fuji Photo Film Co. Ltd., Nakanuma, Minami-Ashigara Machi Ashigara-Kamigura, Kanagawa, Japan

[ * ] Notice: The portion of the term of this patent subsequent to Apr. 28, 1987, has been disclaimed.

[22] Filed: Dec. 4, 1969

[21] Appl. No.: 882,246

Related U.S. Application Data

[63] Continuation-in-part of Ser. Nos. 513,958, Dec. 15, 1965, and Ser. No. 627,359, Mar. 31, 1967.

[30] Foreign Application Priority Data

Dec. 15, 1964 Japan..................................39/70319
Mar. 31, 1966 Japan..................................41/20130

[52] U.S. Cl...............................................250/62, 250/63
[51] Int. Cl........................................................G03b 41/16
[58] Field of Search..............................................250/62, 63

[56] References Cited

UNITED STATES PATENTS

| | | | |
|---|---|---|---|
| 1,447,430 | 3/1923 | Richardson | 250/63 |
| 2,512,242 | 6/1950 | St. Genies | 250/62 |
| 3,509,338 | 4/1970 | Tajima | 250/62 |

Primary Examiner—Archie R. Borchelt
Assistant Examiner—C. E. Church
Attorney—Sughrue, Rothwell, Mion, Zinn & Macpeak

[57] ABSTRACT

A radiographic method by inserting between an object to be recorded and an X-ray film a sine-wave-like net-screen. The net pattern may be formed by filling a metallic powder having a property of absorbing the X-rays into the concave net pattern of the sine-wave-like screen. The presence of the screen prevents the occurrence of troubles caused by scattered X-rays and permits the tone of the image to be varied by selecting the material filled into the concave net pattern.

23 Claims, 7 Drawing Figures

Patented May 23, 1972

3,665,186

INVENTOR
MATAICHI TAJIMA

BY Sughrue, Rothwell, Mion, Zinn & Macpeak

ATTORNEYS

HALF TONE RADIOGRAPHY METHOD AND APPARATUS

CROSS REFERENCE TO RELATED APPLICATIONS

This application is a continuation-in-part application of U.S. application Ser. No. 513,958, and U.S. application Ser. No. 627,359, filed on Dec. 15, 1965, and Mar. 31, 1967, respectively. This application claims priority based upon Japanese applications Ser. Nos. 70319/1964 and 20130/1966, filed on Dec. 15, 1964, and March 31, 1966, respectively.

The present invention relates to radiographic recording.

Previous methods for the recording of an image which was made by the penetration of energy through an object have been carried out with a radiation-sensitive material, such as an emulsion of silver halide. In such procedures, the intensity of radiation after penetration is converted into the corresponding strength of the response of the radiation-sensitive material, and the latter is further converted into the corresponding photographic densities of the radiation-sensitive material. In such cases, there was frequently used the lead strips of Potter-Bucky diaphragm for eliminating some scattered radiations, because of the fact that the image quality was injured by scattered radiations which might be generated, depending on the nature of an object to be recorded. The Bucky diaphragm comprises a number of lead foils which are of rectangular section and are arranged perpendicularly to the direction of radiations and in parallel with one another. In some cases, two sheets of the Bucky diaphragm may be crossed at an angle therebetween.

By the use of the Bucky diaphragm of such construction, no image may be formed upon the surface area of the radiation-sensitive material located below the lead foils, since no radiation penetrates the lead foils. In the case when one sheet of the Bucky diaphragm is employed, scattered radiations in only one direction are eliminated. Although scattered radiations in two directions, viz., in lateral and lengthwise directions, are eliminated in the case when two sheets of the Bucky diaphragm are employed, there occurs a defect in that surface area on which no images are formed is increased due to their shadow effects.

The Lisholm grid has also been used. This consists of many rectangular lead wires arranged in parallel to each other, in a direction vertical to the radiation. When using two grids, they may be crossed rectangularly or at a certain angle. In the so obtained radiograph, a part covered with the lead grid is not sensitized and is lacking in the image. Although one parallel grid plate eliminates scattered rays in only one direction and two crossed grids eliminate them in both the longitudinal and lateral directions, there is proportionally an increased loss of image due to the shadows of the grid. Consequently, the image is viewed in a lower optical density with the naked eye, that is, the sensitivity of the photographic material is lowered. In the case of using two grids, the sharpness of the image is raised by the scattered ray eliminating effect, but more image loss is found than in using one grid.

In the known process as mentioned above, the photographic material and processing conditions are strictly restricted, because the intensity of radiation and the image density must be in a substantially proportional relation and the latter is restricted by the visible zone of the eyesight. This defect results in "difficulties in using the photographic material" or "difficulties in radiographing."

The present invention relates to a method of forming a radio-graph, wherein the extent of the unradiated area of the radiation-sensitive material is lowered and radiation scattering is prevented by employing a screen the unit pattern of which is wave-like against the penetrating radiation. Details of the method are hereinafter mentioned.

In the accompanying drawing.

Figure 1:
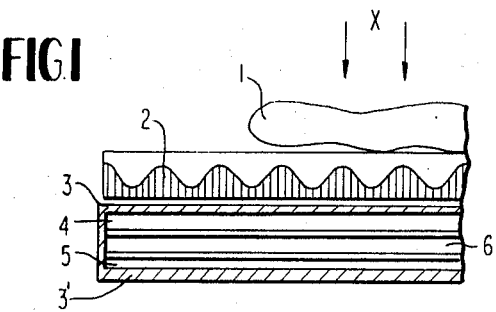
FIG. 1 is a side view of an example according to the invention.

In FIG. 1, a fluorescent intensifying screen or a lead foil screen 4, both being adhered closely to a radiation-sensitive material 6 for recording, are mounted in a film cassette 3 and 3', and the assembly is overlaid with a half tone or net screen 2 of this invention, whereby an image formed upon the penetration of radiation throughout an object 1 to be photographed is recorded thereon.

Figure 2:
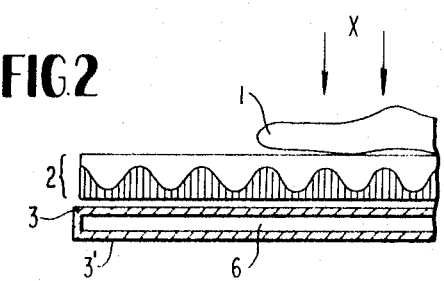
FIG. 2 is a side view of another example according to the invention.

FIG. 2 shows a principle by which an object 1 is directly recorded by means of an assembly comprising a half tone screen 2, a film cassette 3 and 3', and a radiation-sensitive material 6 without using any fluorescent intensifying screen. The construction of said half tone screen will be more fully explained in FIGS. 3 through 6.

Figure 3:
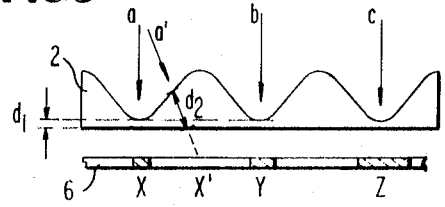
FIG. 3 is a drawing for illustrating the mechanism for the formation of an image.

Referring now to FIG. 3, the half tone or net screen (2) may be made of a material ranging from an atom having a large atomic number, such as lead, to an atom having a small atomic number, such as aluminum, and adjustment of image gradation may be possible depending on the kind of material and the control of the thickness thereof. For example, an attenuation factor or damping coefficient X of X-ray is determined by atomic number Z, density V of a material and wave-length λ of X-ray, and an intensity 1 of X-ray after the penetration is inversely proportional to wave-length λ of X-ray and thickness $d$ of a material. The co-relations therebetween are as follows:

$$X = K Z_3 V\lambda^3 \ldots \quad (A)$$
$$I = I_o{}^{-xd3} \ldots \quad (B)$$

wherein $I_o$ and $K$ represents an intensity of X-ray before the penetration and a proportional constant, respectively.

The half tone or net screen made of a suitable material, being shown in FIG. 3, is of controlled thickness and the section of which is of wave-like form. As the intensity of X-ray becomes greater in proportion as "$a$","$b$" and "$c$", X-ray widely penetrates the concaved portions of the screen 2 over the width thereof, and there are formed a small dot image X, a mean dot image Y and a large dot image Z. In the case of this, if a scattered radiation $a'$ is present and the screen 2 is not present, an image X' resulting from the radiation $a'$ will be formed. On the other hand, if the screen 2 is present, the results are as follows; namely, the intensity of X-ray reaching to the position of the image X' is very weak, since X-ray $a$ is weaker than X-ray $a'$ and the thickness $d_1$ is less than the thickness $d_2$, so that scattered X-rays are eliminated. In order to overcome the defect whereby the surface area where no radiation is applied increases, as in conventional methods, as well as to eliminate scattered radiation, the elimination of said radiation being attained by means of the principle illustrated in FIG. 3, a screen of a construction shown in FIGS. 5 or 6 may suitably be employed according to this invention.

Figure 4:
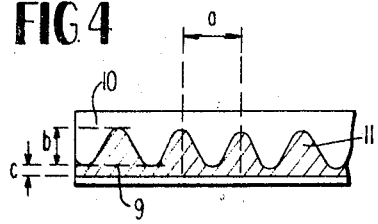
FIGS. 4 through 7 show the construction of a half tone screen of waving from, respectively.

Screen 9 shown in FIG. 4 is preferably cased in a casement 10 for use, and the section as being taken at lines X-Y.

Figure 5:
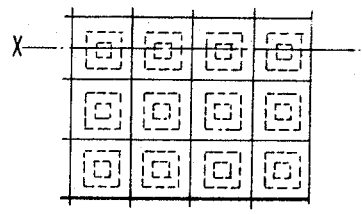
Figure 6:
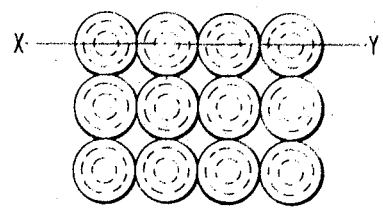

In FIG. 5 showing an enlarged state of the half tone screen, each segment of dotted lines forming a regular square represent a contour line. Similarly, segments of dotted lines forming a circle in FIG. 6 represent a contour line. Any of them is suitably employed for the achievement of the object of this invention. In addition to this a screen of a pattern such as rhombus, an oval and so on may also be used.

The following are examples of this invention:

EXAMPLE 1

A half tone screen shown in FIG. 5, the thickness being 1,500 microns (max.) and 2–5 microns (min.), the lattice spacing (the distance between neighboring concaved portions) being 200 microns, is made of lead, and used photographically.

The chest of a man is photographed on an X-ray film using an X-ray (80 KVP and 200 mA) for 0.08 sec., the distance between the film and an X-ray source being 150 cm. Taking a combination of a film and a developer, there is gained an X-ray photograph of a contrast about twice times higher than that of a conventional one.

As a result of this, there are produced such mesh-like images as dotted image produced in a half tone process using a screen of 150 lines per inch (lattice spacing of about 80 microns). The mesh-like pattern of the image is of an extent which can be appreciated only by a careful investigation with the naked eye, so that the X-ray photograph thus gained is very clear and free from dullness due to scattered radiations.

Such a half tone screen as illustrated in FIG. 4 is also constructed from lead 9 and a plastic material 10. Where the form of the screen is not deformed by external pressure during a period of use, said material, viz., a plastic material, is not required.

EXAMPLE 2

A half tone screen of a section as shown in FIG. 4 is produced by molding a plastic material having concaved portions 11 between portions of wave-like form, and filling it with a composition as hereinafter mentioned to meet the object of this invention. Namely, the composition comprises at least one selected from the group consisting of various kinds of metal powders, a vehicle, and/or a binder. The following are exemplifications of these materials:
1. Metal Powder: Iron, lead, tin, etc., the recommended dimension being less than 50 microns in diameter.
2. Inorganic Salts: Mercuric sulfide (HgS), mercuric oxide (HgO), stannic sulfide $SnS_2$), trilead teroxide ($2PbO$ $PbO_2$), barium sulfate ($BaSO_4$), bismuth oxides (BiO, $Bi_2O_3$, $BiO_2$ and $Bi_2O_5$)

Trilead teroxide is chosen from these inorganic salts, and mixed with tri-acetic-cellulose for the preparation of the screen. The dimension "a", "b" and "c" in FIG. 4 is determined as about 100 microns, about 200 microns and about 15 microns, respectively. The half tone screen of these dimensions is used for photography. More particularly, the half tone screen is overlaid with a lithographic film interposed between a set of intensifying screens. The x-ray tube-voltage is set to 150 KVP. A sheet of steel, 5 cm in thickness, is radiated with X-rays for a non-destructive inspection. The photograph thus gained is of sharpness higher than that of a photograph gained by a conventional process. This shows the fact that smaller amounts of radiations scattered by the object to be inspected reach the photographic film.

Figure 7:
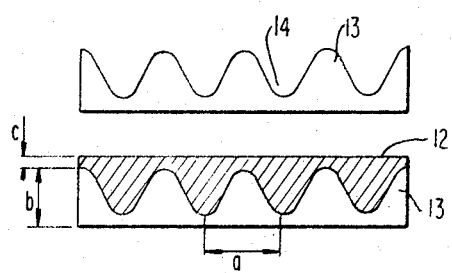

Furthermore, the constitution of the net screen is devised in the invention in order to overcome the image lack parts found in the prior art, as shown in FIGS. 5 and 6, while eliminating the scattered rays according to the principle of FIG. 3. The cross-sectional view along line X–Y and X'–Y' of FIG. 5 or FIG. 6 is shown in FIG. 7 and net screen 9 is preferably held by molding material 13 as shown therein. FIG. 5 is an enlarged representation of the net screen, each square of dotted line representing the contour line, while each circle representing the contour line similarly in FIG. 6. The object of the invention can be accomplished by the use of any of them. Of course, lozenge, oval and other shapes in projection are available.

Some procedures of making the above-mentioned wave-shaped screen of radiation absorbing material are as follows: Concave part 14 of plastic molding 13 is filled with one or a mixture of the heretofore mentioned following powdered radiation absorbing materials and then covered with a paste, or filled therewith by the use of a binding agent, as shown in FIG. 7. In some cases, the powder may be mixed with a binding agent and molded as shown in FIG. 7 (upper) without use of the plastic molding.

EXAMPLE 3

Mercury sulfide and cellulose acetate were mixed in a proportion of 3 to 1 by weight and charged to the concave part of plastic 13 of FIG. 7. The dimensions, a, b, c of FIG. 7 of the plastic were (a): 80 microns (80 or 400 microns); (b) : 200 microns; (c) : 20 microns. A light-sensitive material for designing and fluorescent intensifying paper were superposed and held by a cassette. Then, using the resulting assembly, the non-destructive testing of an iron casting of about 5 cm in thickness was carried out by X-rays of 250 KVP to thereby obtain a very sharp radiograph.

From the above it will be appreciated that there are essentially two embodiments in the present invention. The most basic form involves the use of a screen having a sine wave like form with concave and convex portions. An embodiment thereof comprises filling said concave portions with a powdered material or powdered material compound.

The lattice spacing of the grids of the present invention will generally fall within the range 80 to 400 microns, although some variation is possible. This, of course, forms the preferred lattice spacing range of this invention.

I claim:
1. In a method for recording a radiograph comprising positioning an X-ray sensitive material for recording at a place behind an object to be radiographed, and irradiating said object with X-rays, the improvement comprising,
    interposing a half tone screen of sine-wave-like form having repeating, alternate concave and convex portions which provide a constantly changing repetitive cross-sectional variation in the X-ray permeability of the screen, said screen having a spacing between peaks of neighboring concave portions of from about 80 microns to about 400 microns, and said screen being interposed at a place between the object and the X-ray sensitive material for recording.
2. The method of claim 1 wherein said half tone screen is molded from a material selected from the group consisting of a metal, a metal powder, a composition of a metal powder and a binder, powdered metal salts, and an admixture of powdered metal salts and a binder.
3. The method of claim 1 further comprising interposing a fluorescent intensifying screen between said half tone screen and said X-ray sensitive material.
4. The method of claim 1 wherein said screen has a spacing of from about 80 to about 200 microns.
5. The method of claim 1 wherein said screen has a spacing of about 200.
6. The method of claim 1 wherein a powdered metal or powdered metal compound is filled in the concave portions of said half tone screen.
7. The method of claim 6 wherein the spacing is 200.
8. The method of claim 6 wherein the spacing is 400 microns.
9. The method of claim 1 wherein said screen has a spacing of about 400 microns.
10. The method of claim 1 wherein a powdered metal compound is filled in the concave portions of said half tone screen.
11. The method of claim 1 wherein said half tone screen is in the form of a sine-wave.
12. A radiation absorbing half tone screen comprising a support member of sine-wave-like form having repeating, alternate concave and convex portions which provide a constantly changing repetitive variation in the X-ray permeability of the screen, said screen having a spacing between peaks of neighboring concave portions in the range of from about 80 microns to about 400 microns.
13. The radiation absorbing half tone screen of claim 12 wherein said concave portions are filled with powdered metal.
14. The radiation absorbing half tone screen of claim 12 wherein said concave portions are filled with a powdered metal compound.
15. The radiation absorbing half tone screen of claim 12 wherein said half tone screen is molded from a material selected from the group consisting of a metal, a metal powder, a composition of a metal powder and a binder, powdered metal salts, and an admixture of powdered metal salts and a binder.

16. The radiation absorbing half tone screen of claim 15 wherein said half tone screen is molded from a material selected from the group consisting of a metal, a metal powder and a composition of a metal powder and a binder, wherein said metal powder is less than 50 microns in diameter.

17. The radiation absorbing half tone screen of claim 16 wherein said metal powder is selected from the group consisting of iron, lead and tin.

18. The radiation absorbing half tone screen of claim 15 wherein said half tone screen is molded from a material selected from the group consisting of powdered metal salts and an admixture of powdered metal salts and a binder.

19. The radiation absorbing half tone screen of claim 18 wherein said metal salt is selected from the group consisting of mercuric sulfide, mercuric oxide, stannic sulfide, trilead teroxide, barium sulfate, and bismuth oxides.

20. The radiation absorbing half tone screen of claim 15 wherein said binder is resinous.

21. The radiation absorbing half tone screen of claim 18 wherein said binder is resinous.

22. The radiation absorbing half tone screen of claim 12 wherein said spacing is in the range of from about 80 microns to about 200 microns.

23. The radiation absorbing half tone screen of claim 12 wherein said support is in the form of a sine-wave.

* * * * *